(12) United States Patent
Swidersky et al.

(10) Patent No.: US 11,525,685 B2
(45) Date of Patent: Dec. 13, 2022

(54) SYSTEMS AND METHODS FOR CREATING ELECTRONIC INDOOR MAPS FOR EMERGENCY SERVICES

(71) Applicant: MappedIn Inc., Waterloo (CA)

(72) Inventors: James Nathan Swidersky, Kitchener (CA); Erkang Wei, Waterloo (CA)

(73) Assignee: MappedIn Inc., Waterloo (CA)

( * ) Notice: Subject to any disclaimer, the term of this patent is extended or adjusted under 35 U.S.C. 154(b) by 545 days.

(21) Appl. No.: 16/435,661

(22) Filed: Jun. 10, 2019

(65) Prior Publication Data

US 2019/0390962 A1     Dec. 26, 2019

Related U.S. Application Data

(60) Provisional application No. 62/687,864, filed on Jun. 21, 2018.

(51) Int. Cl.
*G01C 21/20* (2006.01)
*H04L 67/52* (2022.01)
*G06F 3/04842* (2022.01)
*G06T 11/60* (2006.01)
*G06F 3/0486* (2013.01)

(52) U.S. Cl.
CPC .......... *G01C 21/206* (2013.01); *H04L 67/52* (2022.05); *G06F 3/0486* (2013.01); *G06F 3/04842* (2013.01); *G06T 11/60* (2013.01); *G06T 2200/24* (2013.01)

(58) Field of Classification Search
CPC ..... H04L 67/18; H04L 67/12; G06T 2200/24; G06T 11/60; G06T 11/00; G06F 3/04842; G06F 3/0486; G01C 21/206; G01C 21/32; H04W 4/33; H04W 4/90
See application file for complete search history.

(56) References Cited

U.S. PATENT DOCUMENTS

| | | | | |
|---|---|---|---|---|
| 2014/0137017 | A1* | 5/2014 | Sharma | G01C 21/206 715/767 |
| 2014/0274108 | A1* | 9/2014 | Venkatraman | G01S 5/0263 455/456.1 |
| 2019/0318611 | A1* | 10/2019 | Gravel | G06F 3/147 |

* cited by examiner

*Primary Examiner* — Yuen Wong
(74) *Attorney, Agent, or Firm* — Own Innovation; James W. Hinton

(57) ABSTRACT

Systems and methods for creating electronic indoor maps for emergency services are provided. The system has a processor operatively coupled to at least one storage unit and a communication component, the processor being configured for: receiving a service provider identifier from a computing device of at least one computing device; granting the computing device access to an annotation layer of an electronic map of at least one electronic map based on the service provider identifier; generating at least one annotation in response to receiving at least one selection of a service resource within a facility from the computing device; and storing the at least one annotation in the annotation layer.

18 Claims, 7 Drawing Sheets

SYSTEMS AND METHODS FOR CREATING ELECTRONIC INDOOR MAPS FOR EMERGENCY SERVICES

TECHNICAL FIELD

The embodiments disclosed herein relate to electronic indoor maps, and, in particular to systems and methods for creating electronic indoor maps for emergency services.

INTRODUCTION

Recent advancements in technology have transformed the ways in which people orient themselves and navigate from place to place, i.e., wayfinding. For instance, technologies such as global positioning system (GPS)-enabled devices and map applications have made outdoor wayfinding more convenient and accurate.

However, fewer advancements have been made in technology relating to wayfinding within a facility, i.e., facility wayfinding, where GPS typically is not viable for wayfinding. As a result, usually static physical signs and directories are used for wayfinding within facilities. Such signs and directories are expensive to update and may provide limited wayfinding information.

Wayfinding within a facility can be particularly time-sensitive for emergency service personnel. When emergency service personnel attend to an emergency event at a facility, they require accurate knowledge of key service resources (i.e., fire hydrants, gas shutoffs, exits, etc.) within the facility and how to navigate the facility, such as emergency routes. Since emergency service personnel are not typically present at any given venue or facility on a daily basis, they may not be as familiar with the venue or facility and instead, rely on hardcopy maps of the venue or facility. Emergency responders often annotate indoor maps with the location of these service resources. However, the current process for generating and updating these annotations is time-consuming and often results in maps that are outdated or otherwise inaccurate.

SUMMARY

Digital mapping may provide some advantages over static paper maps. One of these advantages may be the opportunity to consume an electronic representation of a facility which serves as a more up-to-date and relevant representation of a given real-world space.

Emergency service personnel can require specific information about the real-world space that is not included in digital maps for typical users or patrons of the facility. Examples of emergency service specific information include, but is not limited to, resources such as fire hydrants and fire hoses and gas shut-off valves. Such information is typically provided to emergency services at the development phase of a facility or venue but can be changed thereafter.

To help emergency service personnel navigate venues and facilities during an emergency event, a wayfinding system may provide one or more emergency service indoor navigation tools or frameworks. The emergency service indoor navigation tools may use up-to-date data from existing wayfinding system, may be part of existing wayfinding systems, and may be accessed, for example, via portal management module or in any other suitable way. The subject matter of the present application can also highlight important and useful information specific to emergency services.

The various embodiments described herein generally relate to methods (and associated systems configured to implement the methods) for creating electronic indoor maps for emergency services. The method involves operating a processor to receive a service provider identifier from a computing device of at least one computing device; grant the computing device access to an annotation layer of an electronic map of a facility based on the service provide identifier; generate at least one annotation in response to receiving at least one selection of a service resource within the facility from the computing device; and store the at least one annotation in the annotation layer in a storage component.

In some aspects, granting the computing device access to an annotation layer of an electronic map involves: determining a jurisdictional region associated with the service provider identifier; and granting the computing device with access to an annotation layer of the at least one electronic map associated with the jurisdictional region of the service provider identifier, each facility represented in the at least one electronic map being located within the jurisdictional region of the service provider identifier.

In some aspects, the method can further involve operating the processor to, prior to determining the jurisdictional region associated with the service provider identifier: obtain an area bound definition, the area bound definition including a plurality of geographical locations; associate the jurisdictional region with the area bound definition; and associate at least one electronic map of the plurality of electronic maps representing at least one facility having a geographical location of the area bound definition with the jurisdictional region of the area bound definition.

In some aspects, obtaining an area bound definition involves at least one of: receiving the area bound definition for the at least one jurisdictional region inputted at a computer device of the at least one computing device; and importing the area bound definition from a geographic information system.

In some aspects, generating at least one annotation in response to receiving at least one selection of a service resource within the facility from the computing device involves: presenting a plurality of service resource types; receiving a selection of a service resource type of the plurality of service resource types; receiving at least a portion of the electronic map to be associated with the selected service resource type, the portion of the electronic map representing a location of the service resource within the facility; and generating an annotation representing of the selected service resource type and the portion of the electronic map.

In some aspects, receiving at least a portion of the electronic map to be associated with the selected service resource type involves: determining a current position of the computing device, the current position being within the facility represented in the electronic map; and providing the current position of the computing device as the at least a portion of the electronic map to be associated with the selected service resource type.

In some aspects, receiving at least a portion of the electronic map to be associated with the selected service resource type involves receiving a selection of at least a portion of the electronic map from the computing device to be associated with the selected service resource type.

In some aspects, the method can further involve operating the processor to: receive a second service provider identifier from a second computing device of the at least one computing device; grant to a second computing device access to a second annotation layer of the electronic map based on the second service provider identifier; generate at least one annotation in response to receiving at least one selection of a service resource within the facility from the second computing device; and store the at least one annotation in the second annotation layer.

In some aspects, the service resource within the facility involves at least one of a standpipe connection, a sprinkler pipe connection, a fire hydrant, a gas shut off, a lock box, a fan, a waste disposal room, a waste disposal chute, a waste disposal dumpster, a firefighter phone, an elevator, a sprinkler room, a fire hose cabinet and class, an emergency back-up generator, an overhead door, a main electrical shut off, a roof hatch, an annunciator panel, a roof access stairwell, a unit number, a stairwell label, an access code, a smoke detector, and a defibrillator.

In another broad aspect, a system for creating electronic indoor maps for emergency services is disclosed. The system includes at least one storage component for storing at least one electronic map and at least one annotation for the at least one electronic map, the at least one annotation being representative of a service resource within the facility; a communication component to transmit data including the at least one electronic map and the at least one annotation with a computing device via a communication network; a processor operatively coupled to the at least one storage unit and the communication component, the processor being configured for: receiving a service provider identifier from a computing device of the at least one computing device; granting the computing device of the at least one computing device access to an electronic map of the at least one electronic map of the facility based on the service provide identifier; providing the at least one electronic map to be displayed on the computing device; generating at least one annotation in response to receiving at least one selection of a service resource within the facility from the computing device; and storing the at least one annotation in association with the at least one electronic map and the service provider identifier to the storage component.

In some aspects, the processor being configured for granting the computing device access to an annotation layer of an electronic map, further includes the processor being configured for: determining a jurisdictional region associated with the service provider identifier; and granting the computing device with access to an annotation layer of the at least one electronic map associated with the jurisdictional region of the service provider identifier, each facility represented in the at least one electronic map being located within the jurisdictional region of the service provider identifier.

In some aspects, the processor being configured for, prior to determining the jurisdictional region associated with the service provider identifier: obtaining an area bound definition, the area bound definition including a plurality of geographical locations; associating the jurisdictional region with the area bound definition; associating at least one electronic map of the plurality of electronic maps representing at least one facility having a geographical location of the area bound definition with the jurisdictional region of the area bound definition.

In some aspects, the processor being configured for obtaining an area bound definition includes the processor being configured for at least one of: receiving the area bound definition for the at least one jurisdictional region inputted at a computer device of the at least one computing device; and importing the area bound definition from a geographic information system.

In some aspects, the processor being configured for generating at least one annotation in response to receiving at least one selection of a service resource within the facility from the computing device includes the processor being configured for: presenting a plurality of service resource types; receiving a selection of a service resource type of the plurality of service resource types; receiving at least a portion of the electronic map to be associated with the selected service resource type, the portion of the electronic map representing a location of the service resource within the facility; and generating an annotation representing of the selected service resource type and the portion of the electronic map.

In some aspects, the processor being configured for receiving at least a portion of the electronic map to be associated with the selected service resource type includes the processor being configured for: determining a current position of the computing device, the current position being within the facility represented in the electronic map; and providing the current position of the computing device as the at least a portion of the electronic map to be associated with the selected service resource type.

In some aspects, the processor being configured for receiving at least a portion of the electronic map to be associated with the selected service resource type includes the processor being configured for receiving a selection of at least a portion of the electronic map from the computing device to be associated with the selected service resource type.

In some aspects, the processor is further configured for: receiving a second service provider identifier from a second computing device of the at least one computing device; granting to a second computing device access to a second annotation layer of the electronic map based on the second service provider identifier; generating at least one annotation in response to receiving at least one selection of a service resource within the facility from the second computing device; and storing the at least one annotation in the second annotation layer.

In some aspects, the service resource within the facility includes at least one of a standpipe connection, a sprinkler pipe connection, a fire hydrant, a gas shut off, a lock box, a fan, a waste disposal room, a waste disposal chute, a waste disposal dumpster, a firefighter phone, an elevator, a sprinkler room, a fire hose cabinet and class, an emergency back-up generator, an overhead door, a main electrical shut off, a roof hatch, an annunciator panel, a roof access stairwell, a unit number, a stairwell label, an access code, a smoke detector, and a defibrillator.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
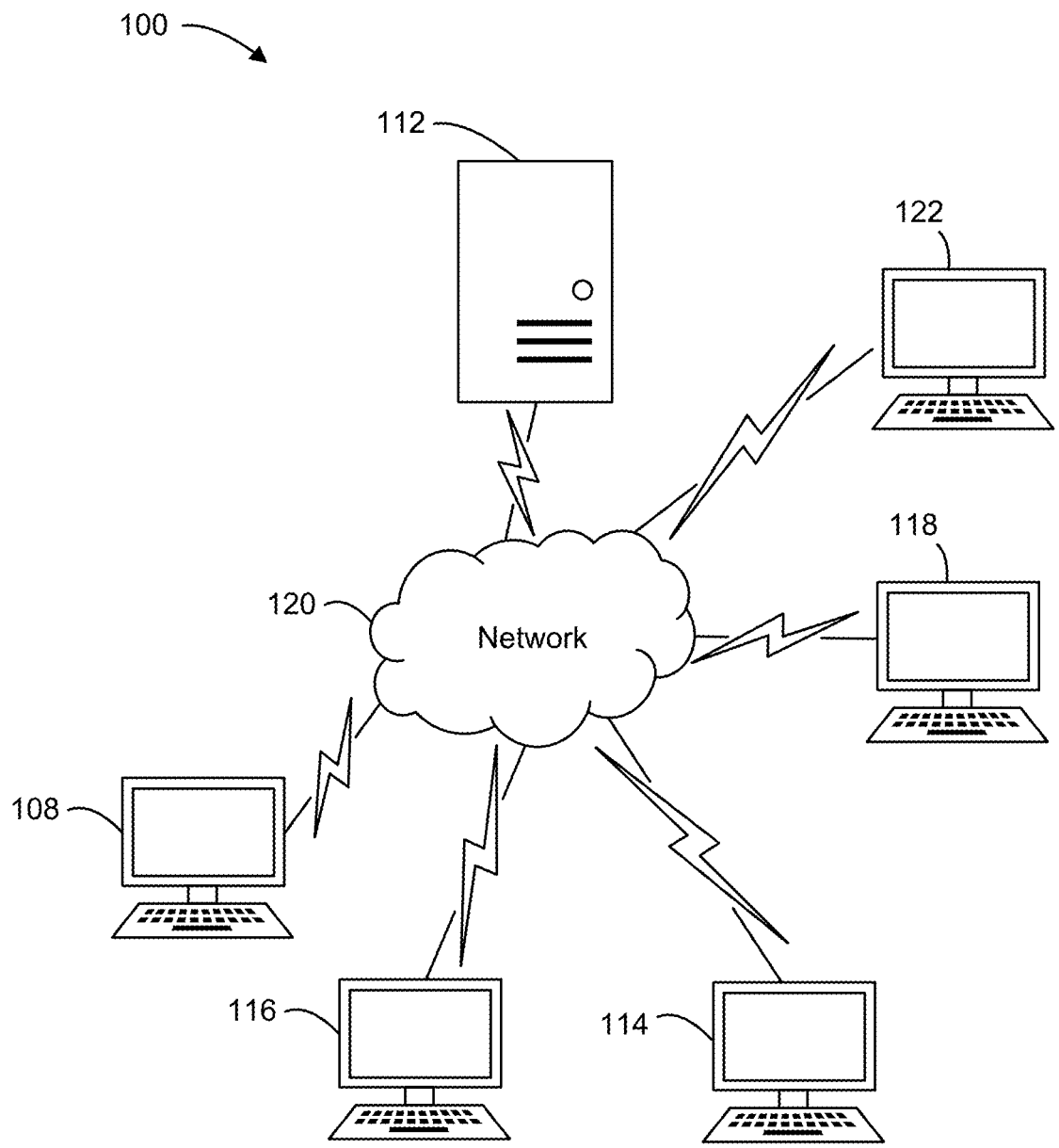
FIG. 1 is a diagram of a wayfinding system, in accordance with an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components is described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Emergency service personnel may arrive at a facility in response to an emergency situation. Emergency service personnel (i.e., emergency responders, first responders) can include, but is not limited to, firefighters, police or law enforcement, and ambulance.

Often times, a commander refers to a hardcopy map of the facility to assess the situation and, using radio-communications, sends or directs emergency service personnel within the facility based on their understanding of the facility from the map. For example, firefighters can be directed by their platoon chief to evacuate a building or to rescue someone, including other emergency service personnel (i.e., other firefighters) that are already in the building. In extreme circumstances, the commander may even need to decide whether to stop sending additional emergency service personnel into the facility. However, the hardcopy map can be out of date.

Furthermore, emergency service personnel responding to events at facilities often rely on indoor maps which are annotated to show locations of key service resources (i.e., fire hydrants, gas shutoffs, exits, etc.). These annotations can also be out of date.

The current process for creating and updating these annotations is time-consuming and often results in maps which are outdated or otherwise inaccurate. Relying on outdated and inaccurate maps may be especially problematic for emergency responders acting under time-constraints.

More specifically, the current process for annotating indoor facility maps with service resources often begins with a facility owner submitting a facility plan to a municipal department. In many cases, the plans are submitted years in advance of construction commencing on the facility. Accordingly, where the facility is modified during the construction phase, the submitted plans are typically rendered inaccurate. The facility plans are then forwarded by the municipal department to the relevant emergency service provider (i.e., the fire or police services). The emergency service provider may then process the maps into a digital format. A site audit is conducted by the emergency service provider in order to manually, or digitally, annotate the map with the location of key service resources. In areas with rapid building construction, a back log of several months may accrue before the service provide is able to both process the maps, and conduct the site audits. The result is that emergency responders may attend to a facility without knowledge of the facility layout. Further, in order to keep the annotated maps up-to-date, site audits may be subsequently conducted on an annual basis. However, these annual site audits are similarly back logged with the result that many indoor facility maps are outdated.

In view of the foregoing, the conventional methods for annotating and updating annotations for indoor facility maps is fraught with shortcomings.

The systems and methods disclosed herein can provide up-to-date indoor maps with information of relevant service resources in a facility.

FIG. 1 shows a block diagram illustrating one exemplary embodiment of a wayfinding system 100 for creating indoor electronic maps for emergency services, in accordance with some embodiments. The wayfinding system 100 is for a facility including multiple objects i.e., a facility wayfinding system. The wayfinding system 100 is not restricted to a single facility, but may be extended to multiple facilities of the same type and/or different types, each including multiple objects. Examples of objects that may be included in a given facility can include facility units, obstructions, connections, regions and the like. For the purposes of this description, facility units may be configured as stores, rooms and other types of identifiable, generally bounded structures that may form a part of a larger facility.

For example, stores within a shopping center, offices within a commercial office building, classrooms within a school, patient rooms within a hospital, bathrooms inside other structures and the like. Obstructions may be objects that are generally not traversable by the wayfinding system 100 end users and that may tend to impede navigation throughout the facility. Examples of obstructions can include tables, benches, shelves, beds, other furniture, fountains, sculptures and other objects that are placed within a facility or facility unit but typically do not form part of the structure of the facility or facility unit. Connections may be portions of a facility or facility unit that extend between, and connect, two or more traversable areas within the wayfinding system 100. Examples of connections may include hallways, walkways, staircases, elevators, escalators, ramps, moving walkways and the like. Regions may be regions of the facility and/or a facility unit that are generally open, at least partially traversable areas that are not bounded by walls. Examples of regions can include, atriums, foyers, event spaces, stages, open floor area in a store, concourses, public squares, courtyards and the like.

The wayfinding system 100 allows users, e.g., visitors to the facility, to orient themselves and to navigate from place to place within the facility, enabling them to find what they are looking for and to discover things around them. For example, a shopper at a mall can use the wayfinding system 100 to search for a particular store or a particular item or class of items (e.g., shoes), navigate to the relevant location, and/or look at the current promotions.

The facility may be any type of facility, and may include a single building or two or more separate buildings, each of which may include any suitable facility units and other objects. Typically, the facility is a commercial facility or an institutional facility. For example, the facility may be a retail facility, e.g., a mall or a shopping center, an office facility, e.g., an office building, an event facility, e.g., a conference center, an amusement park, or a theme park, a transportation facility, e.g., an airport, or a bus terminal, an educational facility, e.g., a school or a university campus, or a medical facility, e.g., a hospital. The facility may be an indoor, an outdoor facility and/or may include a combination of indoor and outdoor portions. However, the wayfinding systems described herein may be particularly useful for indoor facilities and/or facilities with at least some indoor portions.

The facility units in a given facility may be any type of suitable facility units. For example, the facility units may be commonly managed as part of the facility. Some examples of facility units include stores, restaurants, booths, offices, rooms, halls, washrooms, airport gates, and/or locations or areas within the facility. A given facility may include only a single type of facility units, or alternatively a facility may include a mixture of different types of facility units.

The wayfinding system 100 may include a facility wayfinding system, such as those described in U.S. Pat. No. 9,702,706, which is hereby incorporated by reference in its entirety.

In the illustrated example, the wayfinding system 100 includes a server platform 112 which communicates with a plurality of store devices 114, a plurality of facility devices 116, a plurality of administrator devices 118, and a plurality of emergency service provider devices 108 via a communication network 120. The server platform 112 also communicates with a plurality of visitor devices 122. The server platform 112 may be a purpose built machine designed specifically for implementing a system and method for indoor navigation.

The server platform 112, store devices 114, facility devices 116, administrator devices 118, emergency service provider devices 108, and visitor devices 122 may be a server computer, desktop computer, notebook computer, tablet, PDA, smartphone, or another computing device. The devices 112, 108, 114, 116, 118, and 122 may include a connection with the communication network 120 such as a wired or wireless connection to the Internet. In some cases, the communication network 120 may include other types of computer or telecommunication networks. The devices 112, 108, 114, 116, 118, and 122 may include one or more of a memory, a secondary storage device, a storage component, a processor, an input device, a display device, and an output device. Memory may include random access memory (RAM) or similar types of memory. Also, memory may store one or more applications for execution by the processor. Applications may correspond with software modules comprising computer executable instructions to perform processing for the functions described below. Secondary storage devices may include a hard disk drive, floppy disk drive, CD drive, DVD drive, Blu-ray drive, or other types of non-volatile data storage.

The processor of each of devices 112, 108, 114, 116, 118, and 122 may execute applications, computer readable instructions or programs. The applications, computer readable instructions or programs may be stored in memory or in secondary storage, or may be received from the Internet or other communication network 120. Input device may include any device for entering information into device 112, 108, 114, 116, 118, and 122. For example, input device may be a keyboard, key pad, cursor-control device, touch-screen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, device 112, 108, 114, 116, 118, and 122 may include multiple of any one or more of processors, applications, software modules, second storage devices, network connections, input devices, output devices, and display devices.

Although devices 112, 108, 114, 116, 118, and 122 are described with various components, one skilled in the art will appreciate that the devices 112, 108, 114, 116, 118, and 122 may in some cases contain fewer, additional or different components. In addition, although aspects of an implementation of the devices 112, 114, 116, 118, 108, and 122 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other communication network; or other forms of RAM or ROM. The computer-readable media may include instructions for controlling the devices 112, 108, 114, 116, 118, and 122 and/or processor to perform a particular method.

In the description that follows, devices such as server platform 112, store devices 114, facility devices 116, administrator devices 118, emergency service provider devices 108, and visitor devices 122 are described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the devices 108, 114, 116, 118, and 122 may send information to and receive information from the server platform 112. For example, a store user using the store device 114 may manipulate one or more input devices (e.g. a mouse and a keyboard) to interact with a user interface displayed on a display of the store device 114 to respond to questions. Generally, the device may receive a user interface from the communication network 120 (e.g. in the form of a webpage). Alternatively or in addition, a user interface may be stored locally at a device (e.g. a cache of a webpage or a mobile application).

Server platform 112 may be configured to receive a plurality of information, from each of the plurality of store devices 114, facility devices 116, administrator devices 118, emergency service provider devices 108, and visitor devices 122. The store devices 114, facility devices 116, administrator devices 118, emergency service provider devices 108, and visitor devices 122 are herein referred to as user computing devices, or computing devices. Generally, the information may comprise at least an identifier identifying the user who may be associated with a store, associated with a facility, an administrator of the system, an emergency service provider of the facility, or visitor of the store or facility. For example, the information may comprise one or more of a username, e-mail address, password, or social media handle.

In response to receiving information, the server platform 112 may store the information in a storage database. The storage database may correspond with secondary storage of the device 112, 114, 116, 118, and 122. Generally, the storage database may be any suitable storage device such as a hard disk drive, a solid state drive, a memory card, or a disk (e.g. CD, DVD, or Blu-ray etc.). Also, the storage database may be locally connected with server platform 112. In some cases, storage database may be located remotely from server platform 112 and accessible to server platform 112 across the communication network 120 for example. In some cases, storage database may comprise one or more storage devices located at a networked cloud storage provider.

The store device 114 may be associated with a store account. Similarly, the facility device 16 may be associated with a facility account, the administrator device 118 may be associated with an administrator account, the emergency service provider device 108 may be associated with an emergency service provider (i.e., first responders) account, and the visitor device 122 may be associated with a visitor account. Any suitable mechanism for associating a device with an account is expressly contemplated. In some cases, a device may be associated with an account by sending credentials (e.g. a cookie, login, or password etc.) to the server platform 112. The server platform 112 may verify the credentials (e.g. determine that the received password matches a password associated with the account). If a device is associated with an account, the server platform 112 may consider further acts by that device to be associated with that account.

The devices 108, 114, 116, 118, and 122 and the server platform 112 may communicate asynchronously, for example, by using an implementation of the WebSocket protocol, such as Socket.IO. Updates may be sent from the server platform 112 to each of the devices 108, 114, 116, 118, and 122 in real time as interrupts, i.e., without polling. Likewise, user interaction data may be sent from each of the devices 108, 114, 116, 118, and 122 to the server platform 112 in real time as interrupts, i.e., without polling.

Figure 2:
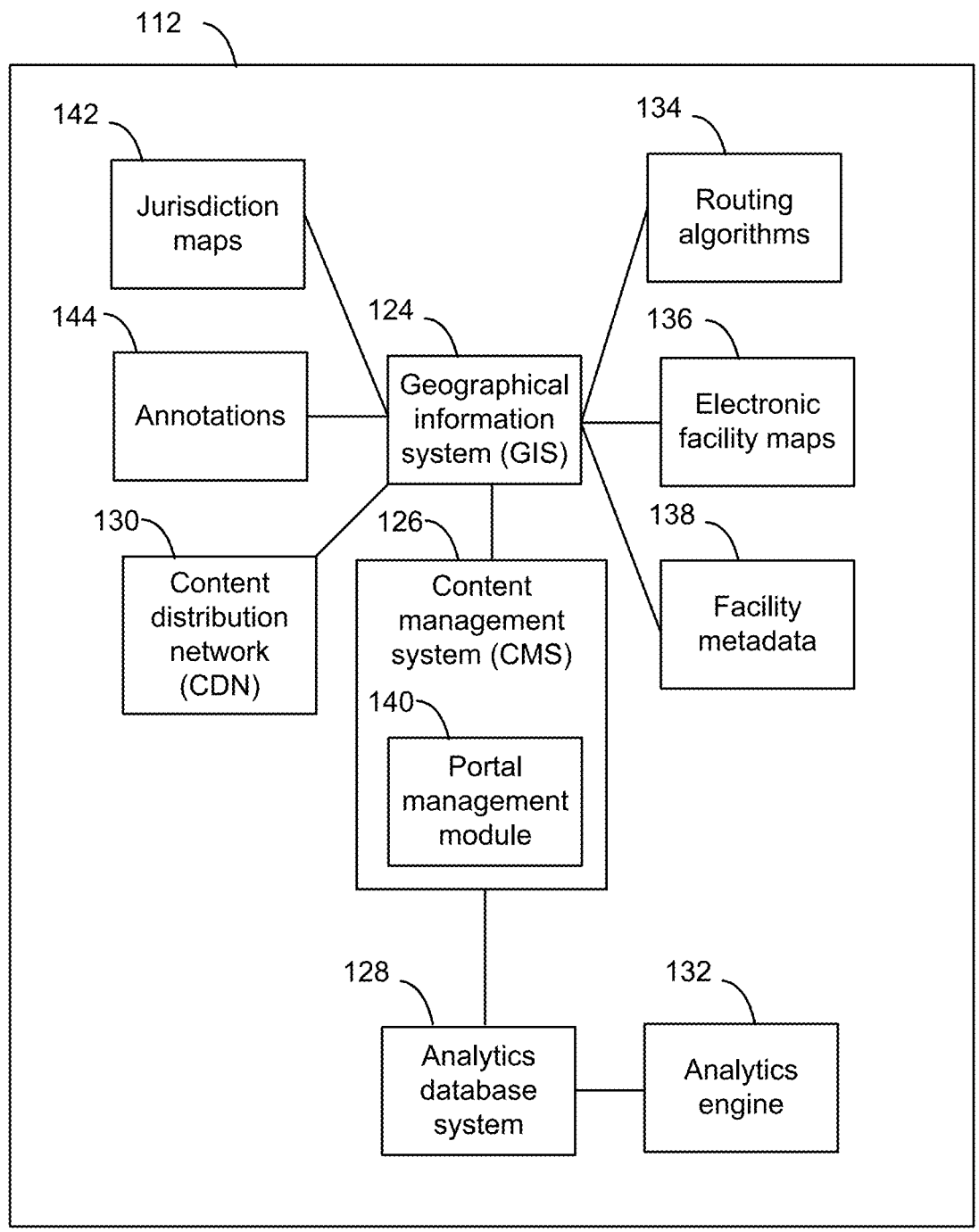
FIG. 2 is a block diagram of a server platform of the wayfinding system of FIG. 1.

Turning now to FIG. 2, illustrated therein is the server platform 112, in accordance with an embodiment. The server platform 112 includes a content management system (CMS) 126, an analytics database system 128, and a geographical information system (GIS) 124. The server platform 112 may include multiple backend devices, e.g., servers. The server platform 112 may include at least a database server and a hosting server. In some instances, the server platform 112 also includes a content distribution network (CDN) 130. The CMS 126 and the analytics database system 128 may be hosted by the server platform 112. The GIS 124 may be hosted internally by the server platform 112 or supplied externally. In some embodiments, each of the GIS 124, CMS 126, analytics database system 128, CDN 130, analytics engine 132, and portal management module 140 may be combined into a fewer number of components or may be separated into further components.

In some embodiments, the CMS 126 may be a front end interface application, typically, implemented as a web service. CMS 126 may communicate with GIS 124, which then modifies the database. In this case, GIS 124 may be an Application Program Interface (API) which manipulates the database.

In some embodiments, CMS 126 stores content, including information relating to the facility and the facility units, handles updates to the content received from the devices 108, 114, 116, 118, and 122, and provides content to the devices 108, 114, 116, 118, and 122. For example, the CMS 126 may be a no structured query language (NoSQL) database application. The content stored in the CMS 126 is customizable for the type of facility. Typically, the information stored for each facility unit includes a profile, a link to a webpage and/or link to a social media page, a photograph, directory information, e.g., a phone number and/or an address, opening hours, event information, promotional information, e.g., an advertisement and/or a marketing message, and/or a promotional item, e.g., a digital coupon. Often, the information relating to the facility and the facility units may be tied to a related entry in the facility metadata 138 stored in the GIS 124. This may allow larger, less frequently accessed files to be stored in the CMS 126, rather than the GIS 124.

In some embodiments, the analytics database system 128 includes or is operatively connected to an analytics engine 132. The analytics database system 128 may be a database application, typically implemented as a web service. The analytics database system 128 stores all user interactions, e.g., user selections or "hits", searches, dates, types of mobile device, and/or movement patterns represented as heat maps, in real time, and generates analytics relating to the user interactions. Advantageously, because user interactions are recorded for several different the devices 108, 114, 116, 118, and 122, a relatively large sample size is obtained. The large sample size may allow analytics engine 132 to plot heat maps that are useful for users and to provide suggestions to improve user experience.

The GIS 124 is, typically, a representational state transfer (REST)-ful application programming interface (API). The GIS 124 includes routing algorithms 134, electronic facility maps 136, associated facility metadata 138, jurisdiction maps 142, and annotations 144. The GIS 124 may store the electronic facility maps 136, the facility metadata 138, jurisdiction maps 142, and annotations 144, handle updates to the electronic facility maps 136, facility metadata 138, jurisdiction maps 142, and annotations 144 and provide the electronic facility maps 136, the facility metadata 138, and the annotations 144 to the devices 108, 114, 116, 118, and 122. Typically, the GIS 124 serves the electronic facility maps 136, e.g., as PNG files, and the facility metadata 138, e.g., as JSON/XML files, over the web. The facility metadata 138 is customizable for the type of facility, and may include digital representations of paths, polygons encapsulating facility units, nodes corresponding to facility locations, identifiers for each facility unit, and qualitative metadata, such as the type of path, e.g., hallway or dirt trail. Optionally, information about the objects utilized for a given system (i.e. all of the objects that are used to define a given facility, etc.) can be stored in the server platform in an object library that can be a separate module on the server platform 112, or may be incorporated within the electronic facility maps 136 module, facility metadata module 138 or any other suitable location.

The GIS 124 also uses the routing algorithms 134 to calculate routes and provides the routes to the devices 108, 114, 116, 118, and 122. Typically, the routing calculations output a JSON/XML list of node or polygon identifiers representing a complete path, which the devices 108, 114, 116, 118, and 122 will interpret and display. The output may also include points of interest and other metadata 138, such as total estimated travel time based on type of path and real-time traffic, as described herein.

The visitor devices 122 may be efficiently managed and run both online and offline. The visitor devices 122 may create a simple navigation tool that engages visitors as they seek out more information about the venue. Each interface may be carefully designed with a focus on the user experience. Designs can be adapted to each venue's brand and specific needs, providing a unique interface with no disruption to the user experience. The visitor devices 122 may be configured to provide a smooth, intelligent personal indoor navigation experience. Visitors can access directions and venue information from anywhere in the venue. Alternatively or additionally, visitors can plan routes prior to arriving and contact a location by phone or via social media directly from their personalized profile.

The server platform 112 may include a portal management module 140 for managing the wayfinding system 100. As shown in FIG. 2, the portal management module 140 is a module within the CMS 126. In other embodiments, the portal management module 140 may be external to the CMS 126. The emergency service provider device 108, the store device 114, the facility device 116, and the administrator device 118 can communicate with the portal management module 140 to create and modify facility related data.

With portal management module 140 as shown in FIG. 2, all building data may optionally be generated or modified using one tool via, for example, a web browser.

The portal management module 140 may include collaborative tools with secure user accounts and permissions. In some embodiments, each user may be assigned a role with appropriate security credentials, such as an emergency service provider (emergency service provider device 108), an administrator (administrator device 118), a facility manager (facility device 116), and a store manager (store device 114). The administrator device 118 may have higher security clearance in terms of accessing and updating data, and modifying settings. The portal management module 140 can provision devices 108, 114, 116, and 118 and user accounts, and associate the devices 108, 114, 116, 118 to the user accounts.

As noted above, the portal management module 140 may be separated into further components. For example, a first portal management module (not shown) can manage the creation and modification of the electronic facility maps 136, a second portal management module (not shown) can manage the annotations 144, and a third portal management module (not shown) can manage facility metadata 138.

The emergency service provider device 108 may be configured to have permission to annotate electronic facility maps 136, namely to annotate electronic facility maps 136 with service resources related to their emergency service, but may not have permission to alter electronic facility maps 136. The annotation 144 can include an icon to graphically represent a position of the service resource within the facility. For example, the service resource can be a standpipe connection, a sprinkler pipe connection, a fire hydrant, a gas shut off, a lock box, a fan, a waste disposal room, a waste disposal chute, a waste disposal dumpster, a firefighter phone, an elevator, a sprinkler room, a fire hose cabinet and class, an emergency back-up generator, an overhead door, a main electrical shut off, a roof hatch, an annunciator panel, a roof access stairwell, a unit number, a stairwell label, an access code, a smoke detector, and/or a defibrillator.

The facility device 116 may be configured to change venue and store/room descriptions, logos and so on, but may not have permission to alter electronic facility maps 136, etc. The store device 114 can modify or alter data relating to the store/tenant account that it is associated with. Additional rules may be enforced if desired. For example, users of store/tenant devices may only access and/or change certain data pertaining to certain stores, and so on.

For example, a venue editor may log into portal 140 make edits to an electronic facility map 136 and save the electronic facility map 136 at different stages. The unfinished electronic facility map 136 may be saved in draft mode, where the venue editor may not have permission to publish the updated electronic facility maps 136 until approved by administrator or facility owner from the administrator device 118 or the facility device 116, and the wayfinding system 100 may be configured to track approvals.

To help enable system users, namely emergency service personnel, to create, edit, and maintain the annotations 144 to the electronic facility maps 136, in a useful and correct manner, the wayfinding system 100 may provide one or more map editing tools or frameworks. The map editing tools may be part of the wayfinding system 100, and may be accessed, for example, via the portal management module 140 or in any other suitable way. For example, if not part of the portal management module 140 of the wayfinding system 100, and/or the server platform 112 may include a separate map annotations editing module. The map annotations editing tool may preferably be configured to help emergency service personnel, with little to no design and/or programming experience, to create, edit, and maintain data, such as annotations 144 that can be used in the operation of the wayfinding system 100. The map annotations editing tool may have any suitable configuration that can help guide and/or assist system users in creating their desired data in a useful manner, while still being relatively easy to use and allowing emergency service personnel a relatively high degree of autonomy and design freedom with respect to the annotations 144.

Figure 3:
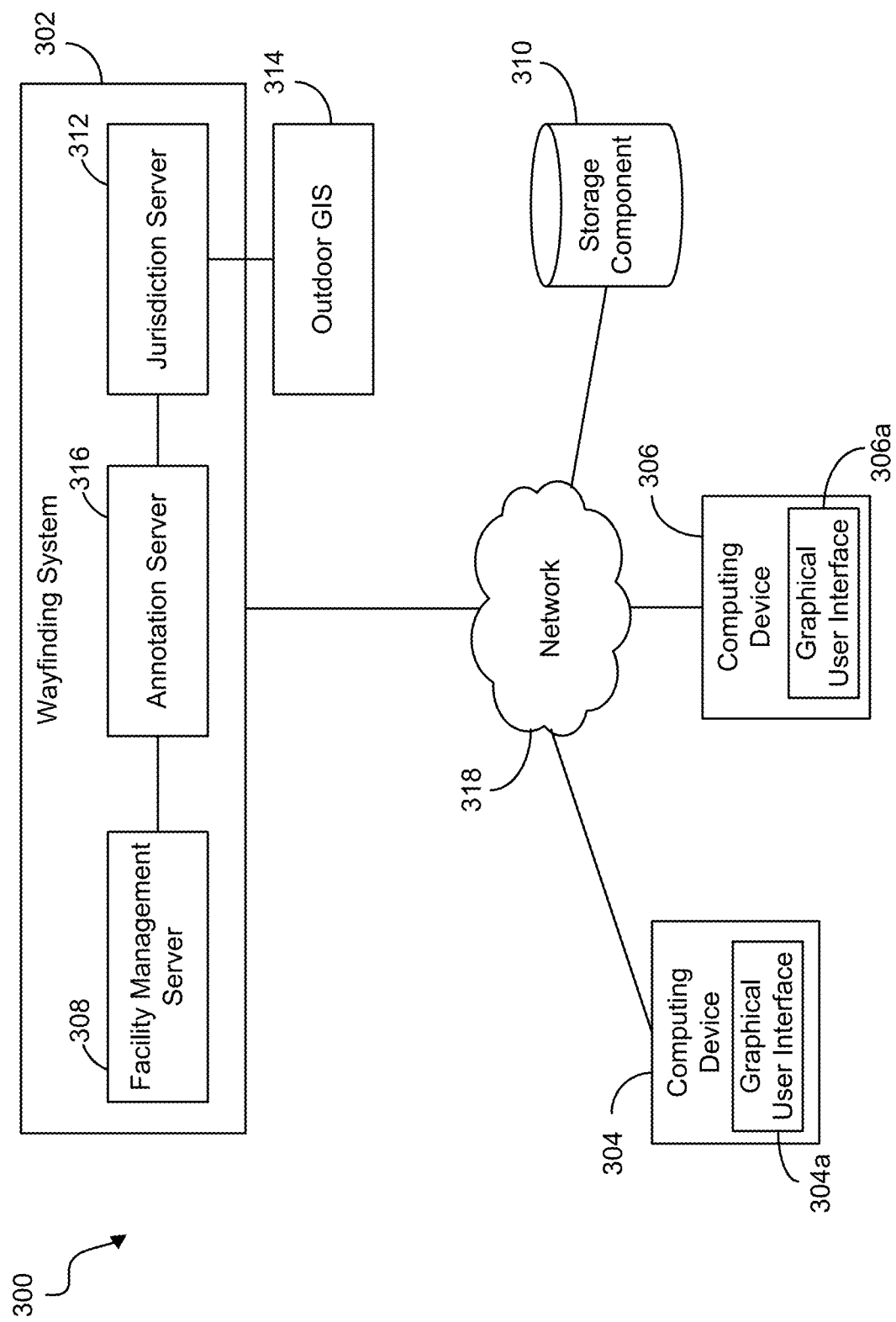
FIG. 3 is a block diagram of a wayfinding system for creating electronic indoor maps for emergency services, in accordance with at least one embodiment.

With reference now to FIG. 3, there is illustrated a block diagram 300 of an example wayfinding system 302 in communication with computing devices 304, 306 and storage component 310, via network 318.

In particular, computing device 304 may be similar to the administrative device 118 in that it allows an administrator to communicate with the wayfinding system 302 and create and modify data contained thereon. The computing device 306 may be similar to the emergency service provider device 108 in that it may be associated with an account of an emergency service provider (i.e., first responder). Although two computing device 304, 306 are shown in FIG. 3, the wayfinding system 302 can be in communication with fewer or more computing devices. The wayfinding system 302 can communicate with the computing devices 304, 306 over a wide geographic area via the network 318.

The wayfinding system 302 includes a processor (not shown), a storage component (not shown), and a communication component (not shown). In some embodiments, each of the processor, the storage component, and the communication component may be combined into a fewer number of components or may be separated into further components. As shown in FIG. 3, the wayfinding system 302 can include one or more servers that may be distributed over a wide geographic area and connected via the network 318.

The processor may be any suitable processors, controllers, digital signal processors, graphics processing units, application specific integrated circuits (ASICs), and/or field programmable gate arrays (FPGAs) that can provide sufficient processing power depending on the configuration, purposes and requirements of the wayfinding system 302. In some embodiments, the processor can include more than one processor with each processor being configured to perform different dedicated tasks.

The processor may be configured to control the operation of the wayfinding system 302. The processor can include modules that initiate and manage the operations of the wayfinding system 302. The processor may also determine, based on received data, stored data, and/or user preferences, how the wayfinding system 302 may generally operate.

The communication component may be any interface that enables the wayfinding system 302 to communicate with other devices and systems. In some embodiments, the communication component can include at least one of a serial port, a parallel port or a USB port. The communication component may also include at least one of an Internet, Local Area Network (LAN), Ethernet, Firewire, modem, fiber, or digital subscriber line connection. Various combinations of these elements may be incorporated within the communication component.

For example, the communication component may receive input from various input devices, such as a mouse, a keyboard, a touch screen, a thumbwheel, a track-pad, a track-ball, a card-reader, voice recognition software and the like depending on the requirements and implementation of the wayfinding system 302.

The storage component can include RAM, ROM, one or more hard drives, one or more flash drives or some other suitable data storage elements such as disk drives, etc. The storage component is used to store an operating system and programs, for example. For instance, the operating system provides various basic operational processes for the processor. The programs include various user programs so that a user can interact with the processor to perform various functions such as, but not limited to, viewing and/or manipulating the electronic facility maps 136 and annotations 144, as well as retrieving and/or transmitting position data of the computing device 304, 306 as the case may be.

The storage component may include one or more databases (not shown). The storage component stores electronic facility maps 136 and annotations 144 for the electronic facility maps 136. In some embodiments, the storage component can store wayfinding data including routing algorithms 134, facility metadata 138 including information related to the facilities, owners, property management, and tenants, jurisdiction maps 142, and emergency services metadata including information related emergency service providers, and information related to computing devices 304, 306.

Electronic facility maps, or electronic indoor maps 136 described herein can include any two-dimensional or three-dimensional representation of the facility. The electronic facility maps 136 can have any size and resolution and can contain objects that comply with any appropriate standard. In some embodiments, the objects of the electronic facility maps 136 can be adjusted in one or more pre-processing stages.

The computing devices 304, 306 may be any networked device operable to connect to the network 318. A networked device is a device capable of communicating with other devices through a network such as the networks 120, 318. A network device may couple to the network 318 through a wired or wireless connection.

The computing devices 304, 306 may include at least a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these.

In some embodiments, the computing devices 304, 306 may be a laptop, a smartphone device, or a wearable device (e.g., a smart watch, smart glasses) equipped with a network adapter for connecting to the Internet. In some embodiments, the connection request initiated from the computing devices 304, 306 may be initiated from a web browser and directed at the browser-based communications application on the wayfinding system 302. The computing devices 304, 306 may include graphical user interfaces (GUI) 304a, 306a, respectively. GUIs 304a, 306a can be integral or separate from computing devices 304, 306.

The network 318 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the wayfinding system 302 and the computing device 304, 306.

The network 318 can include components located within the facility such as beacons and Wi-Fi interface components from which a computing device 304, 306 located within the facility can determine its position.

As noted above, the wayfinding system 302 can include one or more servers that may be distributed over a wide geographic area and connected via the network 318. The wayfinding system 302 is shown in FIG. 3 as including a facility management server 308, an annotation server 316 and a jurisdiction server 312. Each server can be separated into further components such as a processor, storage component, and communication component (not shown).

The facility management server 308 can generate and maintain electronic facility maps 136. The facility management server 308 is similar to server platform 112.

The jurisdiction server 312 can receive a service provider identifier from computing device 304 and determine whether to grant the emergency service provider access to an annotation layer 144 of electronic facility maps 136. The jurisdiction server 312 can determine whether to grant access based on a geographical location of the emergency service provider. That is, the jurisdiction server 312 can determine whether to grant access to an emergency service provider based on a jurisdictional mandate associated with the service provider identifier. The jurisdictional mandate can cover a geographical area, for example, one or more neighborhoods, wards, or districts of a town, city, region, province, or territory. To determine the jurisdictional mandate of an emergency service provider, the jurisdiction server 312 can store and maintain jurisdiction maps 142 defining jurisdictional mandates for different emergency service providers.

Figure 4B:
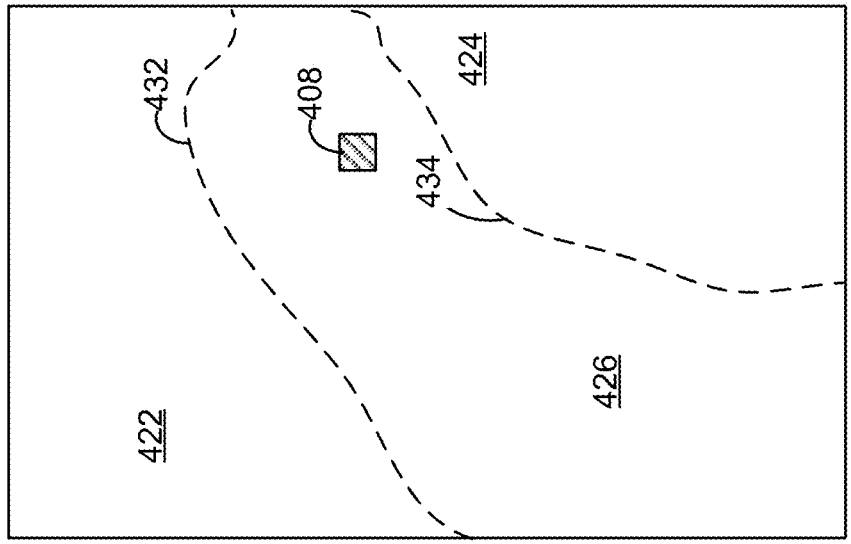
FIGS. 4A and 4B are schematic illustrations of maps which identify example jurisdictional boundaries for various emergency service providers.
Figure 4A:
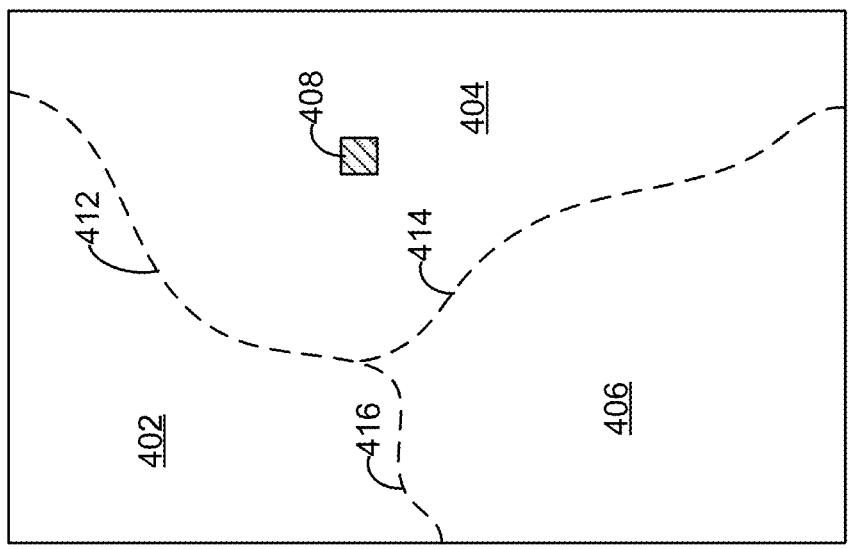

FIGS. 4A and 4B show schematic illustrations of jurisdictional maps defining different jurisdictional mandates of emergency service providers. FIG. 4A illustrates a portion of a jurisdictional map 400A for an emergency service provider that includes geographic regions 402, 404, and 406. Although three geographic regions are shown in FIG. 4A, jurisdictional maps 142 can include with fewer or more geographic regions.

A jurisdictional map 142 can include one or more boundary lines. One or more boundary lines can define a geographic region. Each geographic region can correspond to a jurisdictional mandate of a division of the emergency service provider. In some embodiments, different divisions of an emergency service provider can provide the same emergency service. As shown in FIG. 4A, boundary lines 412 and 416 define geographic region 402. Geographic region 402 can correspond to the jurisdictional mandate of a first division of the emergency service provider. That is, the first division can attend to events in geographic region 402. Boundary lines 412 and 414 define geographic region 404, which can correspond to the jurisdictional mandate of a second division of the emergency service provider. The second division can attend to events in geographic region 404. Boundary lines 414 and 416 define geographic region 406, which can correspond to the jurisdictional mandate of a third division of the emergency service provider. The third division of the emergency service provider may attend to events in geographic region 406.

A facility 408 is illustrated in FIG. 4A as being located within the region 404. That is, the facility is serviced by the second division of the emergency service provider. Accordingly, the wayfinding system 302, via the jurisdiction server 312, can grant access to an emergency service provider to retrieve and annotate an annotation layer 144 of the electronic facility map 136 for facility 408, from the facility management server 308, where the emergency service provider's jurisdictional mandate is determined to cover the geographic region 404.

While the map 400 illustrates the jurisdictional mandates of each division of an emergency service provider as being mutually exclusive and otherwise non-overlapping, in other cases, jurisdictional mandates may substantially overlap. Additionally, one or more divisions of an emergency service provider may be associated with one or more jurisdictional mandates. For example, facility 408 is located within geographic region 404 and serviced by the second division, neighbouring divisions such as the first division and the third division can also provide standby, or back-up service to facility 408.

In some embodiments, the jurisdiction server 312 can maintain jurisdictional maps 142 for different types of service providers. That is, jurisdictional maps 142 can be specific to an emergency service provider. For example, the jurisdictional mandates of various fire departments or divisions in a city may differ geographically from the jurisdictional mandates of various police departments or divisions in the same city.

For example, FIG. 4B illustrates a portion of a jurisdictional map 420 for a second service provider that includes geographic regions 422, 424, and 426. Again, although three geographic regions are shown in FIG. 4A, jurisdictional maps can include with fewer or more geographic regions. As shown in FIG. 4B, geographic region 422 is bounded by boundary line 432 and defines a jurisdictional mandate of a first division of the second service provider. Geographic region 426 is bounded by boundary lines 432 and 434 and defines a jurisdictional mandate of a second division of the second service provider. Geographic region 424 is bounded by boundary line 434 and defines a jurisdictional mandate of a third division of the second service provider.

As shown in the jurisdictional map 420, the facility 408 is associated with an emergency service provider whose mandate covers region 426. The jurisdiction server 312 can grant the emergency service provider associated with region 426 access to annotate an annotation layer 144 of the electronic facility map for facility 408. In some embodiments, each type of service provider will have access to a different annotation layer 144. That is, the jurisdiction server 312 can grant the emergency service provider of geographic region 404 with access to a first annotation layer 144 of the electronic facility map 136 for facility 408. The jurisdiction server 312 can grant the emergency service provider of geographic region 426 with access to a second annotation layer 144 of the electronic facility map 136 for facility 408.

Returning now to FIG. 3, in various embodiments, the records maintained by the jurisdiction server 312 may be managed by a user, such as an administrator, operating computing device 304. The administrator may access the jurisdiction server 312 via network 318 in order to generate, or modify jurisdictional information on the jurisdiction server 312. That is, the administrator may access the jurisdiction server 312 to modify the jurisdiction maps 142. The jurisdictional information may be modified due to, for example, population changes or land development.

To this end, the computing device 304 may operates a management graphical user interface (GUI) 304a. The management GUI 304a allow a user at a computing device 304 to input boundary lines 412, 414, 416, 432, 434 defining area definitions for different geographic regions 402, 404, 406, 422, 424, 426. For example, the management GUI 304a may display an outdoor map 400, 420 and allow a user of computing device 304 to manually draw boundary lines 412, 414, 416, 432, 434 for each geographic region 402, 404, 406, 422, 424, 426. The management GUI 304a may then allow the user to define each geographic region 402, 404, 406, 422, 424, 426 as a jurisdictional mandate of one or more service providers. In other cases, the user can specify boundary definitions for different jurisdictional mandates by using any other suitable input, as for example, by entering longitudinal and latitudinal coordinates.

In at least some embodiments, the jurisdiction server 312 may be operatively connected to an outdoor geographic information system (GIS) 314, as shown in FIG. 3. While FIG. 3 shows the outdoor GIS 314 being external to the wayfinding system 302, in some embodiments, the outdoor GIS 314 is a component of, that is, internal to the wayfinding system 302.

When the outdoor GIS 314 is external to the wayfinding system 302, the outdoor GIS 314 can be an existing GIS used by cities and municipalities to maintain city boundaries. The outdoor GIS 314 can include boundary information available in one of a number of formats used for encoding geographic data structures (e.g., GeoJSON, ESRI shape files, KML, or other geometric shape definition files). The jurisdiction server 312 may automatically import these data structure files from the outdoor GIS 314, parse the data structure files to read the boundary information, and store the boundary information as a jurisdictional map 142. The boundary information can be used to define different jurisdictional mandates. In some embodiments, the administrator at computing device 304 can manually provide input to associate the imported boundary information with each of the jurisdictional mandates. In some embodiments, the jurisdictional mandates are also imported from the outdoor GIS 314.

Returning now to FIG. 3, the annotation server 316 is responsible for storing and managing annotations 144 made to electronic facility maps 136 on the facility management server 308 and/or the storage component 310.

In various embodiments, annotations 144 can be stored in an annotation layer. The annotation layers can be stored on the annotation server 316. The annotations can represent service resources located within a facility. By way of non-limiting examples, the annotations 144 may be in respect of a standpipe connection, a sprinkler pipe connection, a fire hydrant, a gas shut off, a lock box, a fan, a waste disposal room, a waste disposal chute, a waste disposal dumpster, a firefighter phone, an elevator, a sprinkler room, a fire hose cabinet and class, an emergency back-up generator, an overhead door, a main electrical shut off, a roof hatch, an annunciator panel, a roof access stairwell, a unit number, a stairwell label, an access code, a smoke detector, and/or a defibrillator.

In at least some embodiments, the annotations 144 may be received by the annotation server 316 from the computing device 306 associated with an account of an emergency service provider, identified by the service provider identifier.

In particular, the computing device 306 may include a map annotations editing tool, which allows a user, associated with an emergency service provider, to access and annotate an electronic facility map 136 on the facility management server 308. In various cases, as previously discussed, the computing device 306 may be granted access to annotate an annotation layer 144 of an electronic facility map 136 on the facility management server 308 if it is first determined that the facility 408 is located within the emergency service provider's jurisdictional mandate.

The map annotations editing tool may be, for example, a mobile or web application. In at least some cases, the map annotations editing tool can be viewed and accessed from a graphical user interface (GUI) 306a which operates on the computing device 306. The management GUI 306a may be accessed, for example, via the portal management module 140 of the server 112. The GUI 304a may allow a user to view the electronic facility map 136, click or select one or more points on the map, and insert annotations 144 at the selected points. In other cases, the annotations 144 may be added by a drag-and-drop operation to specific points on the electronic facility map 136. Where the computing device 306 includes a touchscreen (i.e. a tablet, or smart phone), the user can select points on an electronic facility map 136 by touching different areas on the touchscreen display and subsequently insert annotations 144 at the selected points.

The computing device 306 can also include a positioning system (i.e. GPS). The positioning system can be used to detect the current position of a user in a facility 408 and allow the user to insert one or more annotations 144 at their current position.

In at least some embodiments, annotations 144 on the electronic facility map 136 may be in the form of visual objects that identify different service resources in the facility. For example, as described in further detail herein, an image of a fire hydrant may be used as an annotation to indicate the presence of a fire hydrant at a particular location in the facility. In other cases, other forms of annotations 144 may be used, including textual, numerical, or audible annotations.

Once the annotation 144 has been inserted by the user on the electronic facility map 136, the computing device 306 may then transmit the annotation 144 back to the annotation server 316 via network 318, whereby annotation data is generated and stored by the annotation server 316. The annotation server 316 maintains annotation data for different annotations 144 in respect of different electronic facility maps 136 on the facility management server 308. The annotations 144 recorded on the annotation server 316 are available for later retrieval if it is later desired to view the annotated map (i.e., when responding to an emergency situation), or it is desired to modify or adjusted the annotations 144 in respect of a particular map.

In at least some embodiments, the annotation server 316 may be updated in real-time, or near-real time, with annotations 144 received from the computing device 306. In the context of the present disclosure, the terms "real-time" or "near real-time" is defined as events or actions within a small temporal window of one another. The purpose of real-time or near real-time map editing is to provide navigation from the indoor navigation system 210 to the computing device 222 within seconds after the electronic map has been edited in order to provide the latest annotations to a user viewing the map. As noted earlier, in emergency situations, it is important for emergency service personnel to have access to accurate and up to date maps.

Emergency service personnel can accordingly conduct site audits using the computing device 306. Annotations 144 added by emergency service personnel during the site audit may be automatically transmitted in real-time, or near-real time, to the annotation server 316. To facilitate the process of annotating during a site audit, the computing device 306 may be a portable device configured to operate the map annotations editing tool. For example, the computing device 306 may be a mobile device, a smart phone, a smart watch, a wearable device, or a tablet.

The annotation server 316 may also maintain annotation data in respect of one or more annotation layers 144 for any given electronic facility map 136 on the facility management server 308. For example, the annotation server 316 may maintain annotation data in respect of a first annotation layer 144 which may be accessible and editable only by a first service provider (i.e. firefighting services), while a second annotation layer 144 may be accessible and editable only by a second service provider (i.e. a police services). Accordingly, the annotation server 316 can manage access to different annotation layers depending on the particular service provider, identified by the service provider identifier. This feature may help to ensure that specific services unique to certain service providers are grouped and/or otherwise editable together. In various cases, these annotation layers 144 may be generated and managed by an administrator operating the computing device 304.

Figure 5A:
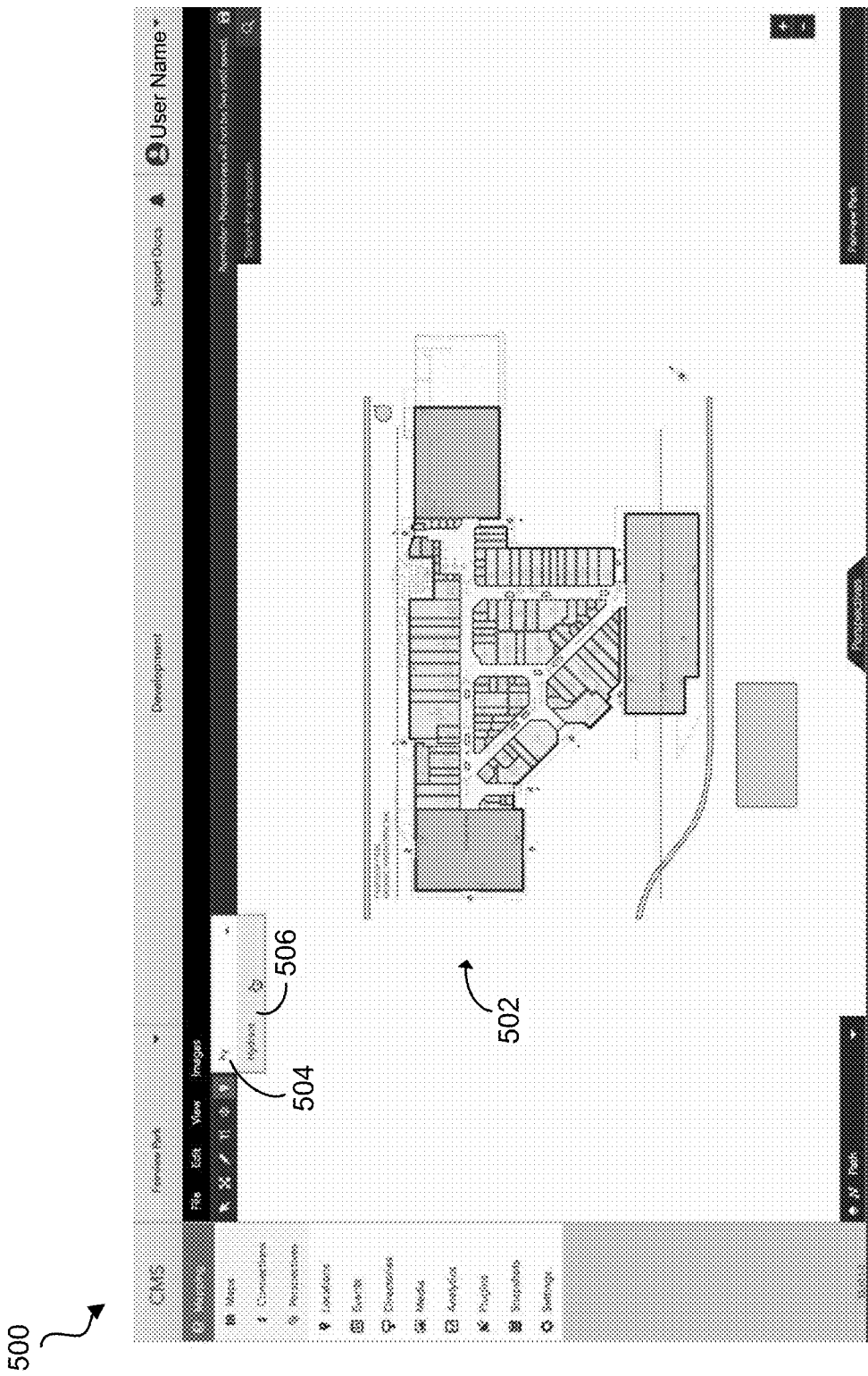
FIGS. 5A and 5B are example user interfaces for annotating an electronic indoor map with service resources.
Figure 5B:
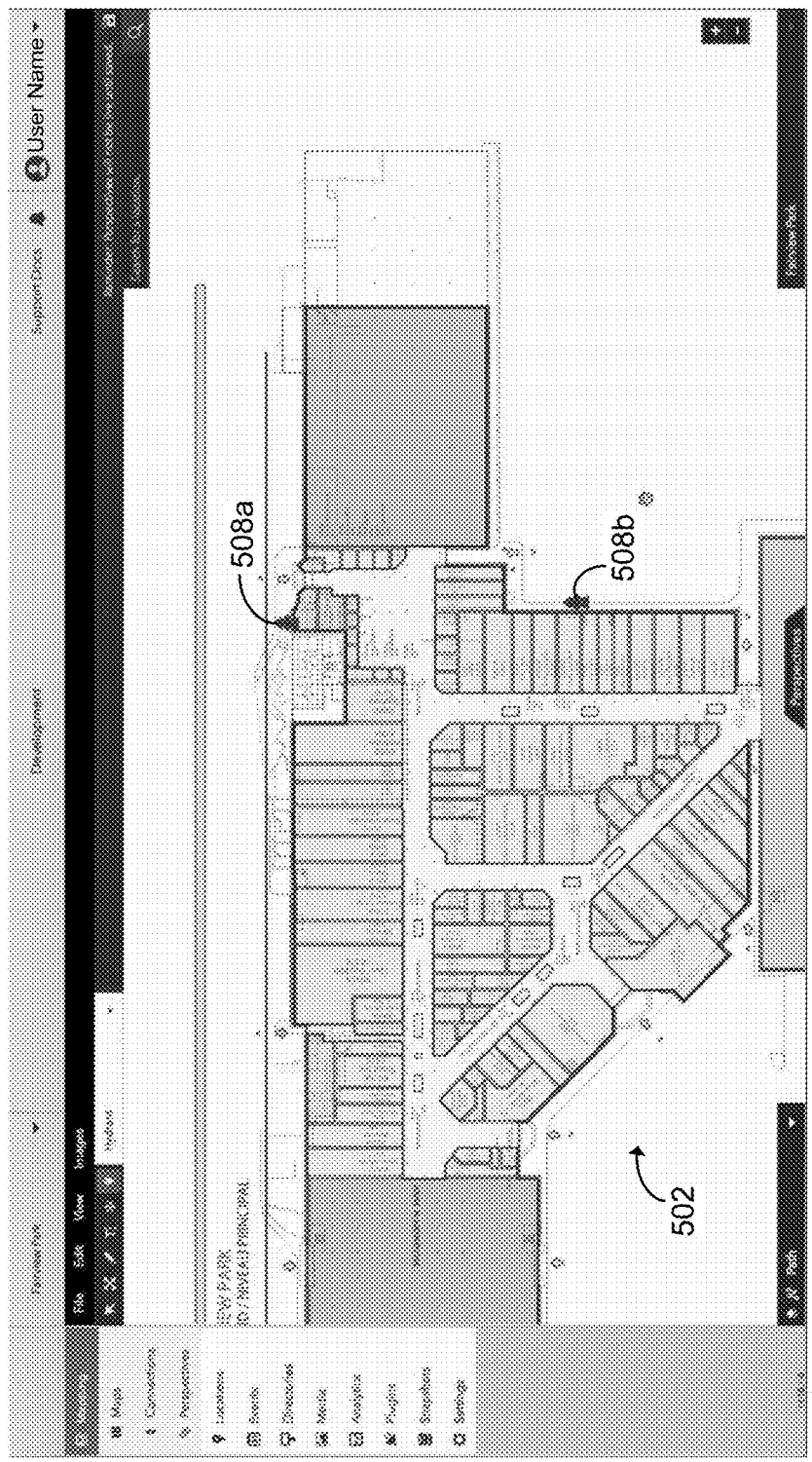

With reference now to both FIGS. 5A and 5B, illustrating an example graphical user interface (GUI) 500 for a map annotations editing tool. The GUI 500 may be analogous to the GUI 306a displayed on the computing device 306 of FIG. 3.

As shown in FIG. 5A, the GUI 500 can display an electronic facility map 502. The electronic facility map 502 can be generated and maintained, for example, by the facility management server 308 of FIG. 3. In order to annotate the electronic facility map 502, the GUI 500 may include a search feature 504 that allows a user at a computing device 306 to search and select from one of a number of pre-defined annotation types. In the illustrated example, the user at the computing device 306 can select an annotation type 506 corresponding to a fire hydrant.

The user at computing device 306 can select to insert a fire hydrant annotation to one or more locations within the electronic facility map 502 to represent the location of actual fire hydrants located in the facility. In response to receiving the user's selections, the GUI 500 may then generate a visual objects 508a and 508b representative of fire hydrants, as shown in FIG. 5B. As the user moves the location of the fire hydrant within the electronic facility map 502, the annotation server 316 can update the annotation data 144 of the annotation layer. Accordingly, the GUI 500 can facilitate the process of inserting and modifying annotations 144 made to the electronic facility map 502.

Figure 6:
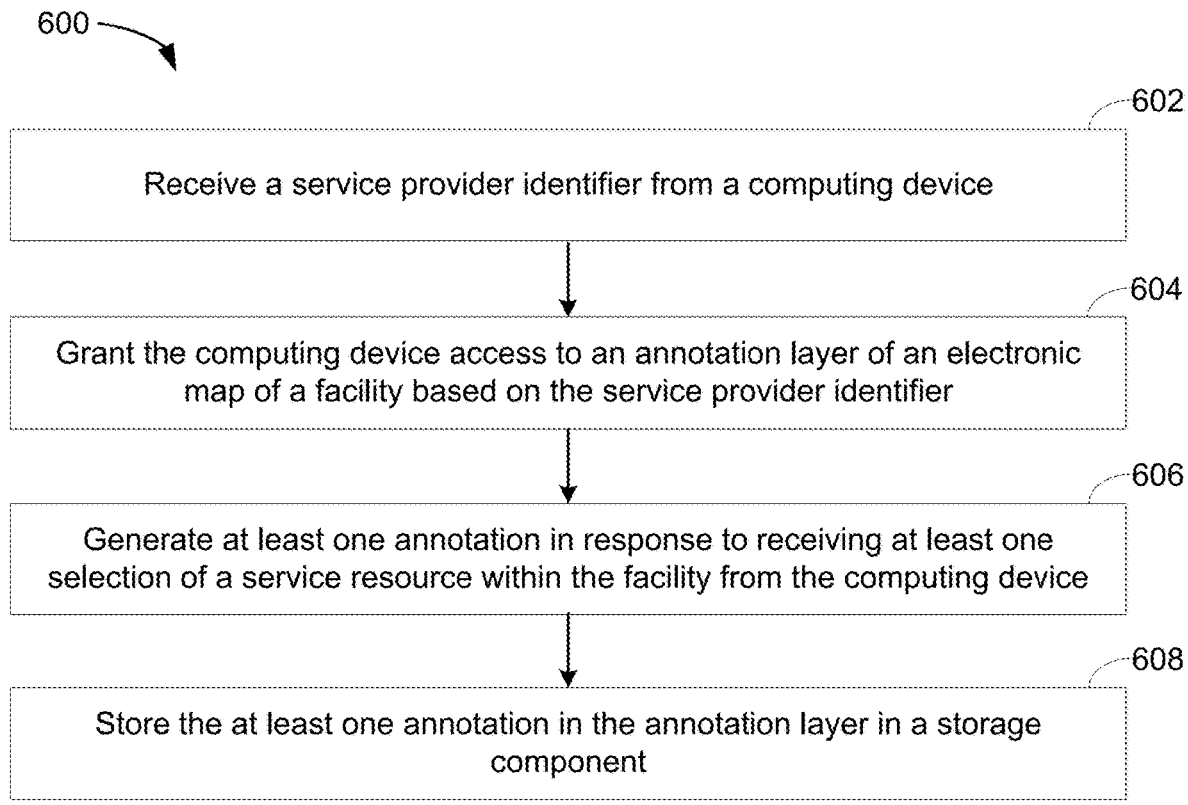
FIG. 6 shows a flow chart of a method for creating electronic indoor maps for emergency services, in accordance with at least one embodiment.

With reference now to FIG. 6, there is shown a flow chart of a method 600 for creating electronic indoor maps for emergency services. The method 600 may be implemented by a processor of the wayfinding system 302 of FIG. 3.

At 602, the wayfinding system 302 receives a service provider identifier from a computing device 306.

At 604, the computing device 306 is granted access to an annotation layer 144 of an electronic facility map 136 on the facility management server 308, based on the service provider identifier. More particularly, the computing device 306 may be granted access to an annotation layer 144 of an electronic facility map 136 if the facility is located in a jurisdictional region which is associated with the service provider identifier (i.e., as determined by the record maintained on the jurisdiction server 312).

At 606, the wayfinding system 302 may generate at least one annotation 144 in response to receiving at least one selection of a service resource within the facility from the computing device.

At 608, the wayfinding system 302 can store the at least one annotation 144 in the annotation layer in a storage component. For example, this may be storage component 310 of FIG. 3.

While the above description provides examples of one or more apparatus, methods, or systems, it will be appreciated that other apparatus, methods, or systems may be within the scope of the claims as interpreted by one of skill in the art.

The invention claimed is:

1. A system for editing electronic maps of facilities by service providers, the system comprising:
at least one data storage drive for storing a plurality of electronic maps and at least one annotation layer associated with each of the plurality of electronic maps, each electronic map comprising a digital image file and representing a facility, the at least one annotation layer associated with each electronic map comprising at least one annotation representing a service resource located within the facility; and
a processor operatively coupled to the at least one data storage drive and configured to communicatively couple to a computing device of a service provider via a communication network, the processor being configured to edit the plurality of electronic maps by:
receiving a service provider identifier from the computing device of the service provider via the communication network;
granting the computing device of the service provider access to at least one annotation layer of an electronic map of the plurality of electronic maps based on the service provider identifier, wherein the service provider identifier determines which of the plurality of electronic maps are accessible and editable by the service provider;
transmitting data including the electronic map and the at least one annotation layer of the electronic map to the computing device of the service provider via the communication network;
generating at least one new annotation in response to receiving a selection of a service resource within the facility and location information for the at least one new annotation from the computing device of the service provider via the communication network;
storing the at least one new annotation in an annotation layer of the at least one annotation layer; and
creating an annotated version of the electronic map by retrieving the at least one new annotation from the annotation layer and adding the at least one new annotation from the annotation layer to the electronic map to generate an annotated electronic map, wherein, when the annotated electronic map is selected for viewing, the annotated electronic map is displayed in a graphical user interface including the electronic map with the at least one new annotation appearing on the displayed annotated electronic map as a visual object representing the service resource.

2. The system of claim 1, wherein the processor being configured for granting the computing device of the service provider access to the at least one annotation layer of the electronic map, further comprises the processor being configured for:
determining a jurisdictional region associated with the service provider identifier; and
granting the computing device of the service provider with access to the at least one annotation layer of the electronic map associated with the jurisdictional region of the service provider identifier, each facility represented in the electronic map being located within the jurisdictional region of the service provider identifier.

3. The system of claim 2, wherein the processor being further configured for, prior to determining the jurisdictional region associated with the service provider identifier:
obtaining an area bound definition, the area bound definition comprising a plurality of geographical locations;
associating the jurisdictional region with the area bound definition; and
associating at least one electronic map of the plurality of electronic maps representing at least one facility having a geographical location of the area bound definition with the jurisdictional region of the area bound definition.

4. The system of claim 3, wherein the processor being further configured for obtaining an area bound definition comprises the processor being configured for at least one of:
receiving the area bound definition for the at least one jurisdictional region inputted at the computing device of the service provider; and
importing the area bound definition from a geographic information system.

5. The system of claim 1, wherein the processor being configured for generating at least one annotation in response to receiving a selection of a service resource within the facility from the computing device of the service provider comprises the processor being configured for:
presenting a plurality of service resources;
receiving a selection of a service resource of the plurality of service resources;

receiving at least a portion of the electronic map to be associated with the selected service resource, the portion of the electronic map representing a location of the service resource within the facility; and generating an annotation representing of the selected service resource and the portion of the electronic map.

6. The system of claim 5, wherein, the processor being configured for receiving at least a portion of the electronic map to be associated with the selected service resource comprises the processor being configured for:

determining a current position of the computing device of the service provider, the current position being within the facility represented in the electronic map; and providing the current position of the computing device of the service provider as the at least a portion of the electronic map to be associated with the selected service resource.

7. The system of claim 5, wherein, the processor being configured for receiving at least a portion of the electronic map to be associated with the selected service resource comprises the processor being configured for receiving a selection of at least a portion of the electronic map from the computing device of the service provider to be associated with the selected service resource.

8. The system of claim 1, wherein the processor is further configured for:

receiving a second service provider identifier from a second computing device;

granting to the second computing device access to a second annotation layer of the electronic map based on the second service provider identifier;

generating at least one annotation in response to receiving at least one selection of a service resource within the facility from the second computing device; and storing the at least one annotation in the second annotation layer.

9. The system of claim 1, wherein the service resource within the facility comprises at least one of a standpipe connection, a sprinkler pipe connection, a fire hydrant, a gas shut off, a lock box, a fan, a waste disposal room, a waste disposal chute, a waste disposal dumpster, a firefighter phone, an elevator, a sprinkler room, a fire hose cabinet and class, an emergency back-up generator, an overhead door, a main electrical shut off, a roof hatch, an annunciator panel, a roof access stairwell, a unit number, a stairwell label, an access code, a smoke detector, and a defibrillator.

10. A computer-implemented method for editing electronic maps of facilities by service providers for the facilities, each electronic map comprising a digital image file, the method comprising operating a processor to:

receive a service provider identifier from a computing device of a service provider, wherein the service provider identifier determines which of a plurality of electronic maps are accessible and editable by the service provider;

grant the computing device of the service provider access to at least one annotation layer of an electronic map of a facility based on the service provide identifier;

generate at least one new annotation in response to receiving a selection of a service resource within the facility from the computing device of the service provider;

store the at least one new annotation in the annotation layer in a data storage drive; and create an annotated version of the electronic map by retrieving the at least one new annotation from the annotation layer and adding the at least one new annotation from the annotation layer to the electronic map to generate an annotated electronic map, wherein, when the annotated electronic map is selected for viewing, the annotated electronic map is displayed in a graphical user interface including the electronic map with the at least one new annotation appearing on the displayed annotated electronic map as a visual object representing the service resource.

11. The method of claim 10, wherein granting the computing device of the service provider access to the at least one annotation layer of an electronic map comprises:

determining a jurisdictional region associated with the service provider identifier; and granting the computing device of the service provider with access to the at least one annotation layer of the electronic map associated with the jurisdictional region of the service provider identifier, each facility represented in the electronic map being located within the jurisdictional region of the service provider identifier.

12. The method of claim 11, further comprising operating the processor to, prior to determining the jurisdictional region associated with the service provider identifier:

obtain an area bound definition, the area bound definition comprising a plurality of geographical locations;

associate the jurisdictional region with the area bound definition; and associate at least one electronic map of the plurality of electronic maps representing at least one facility having a geographical location of the area bound definition with the jurisdictional region of the area bound definition.

13. The method of claim 12, wherein obtaining an area bound definition further comprises at least one of:

receiving the area bound definition for the at least one jurisdictional region inputted at the computing device of the service provider; and importing the area bound definition from a geographic information system.

14. The method of claim 10, wherein generating at least one annotation in response to receiving at least one selection of a service resource within the facility from the computing device of the service provider comprises:

presenting a plurality of service resources;

receiving a selection of a service resource of the plurality of service resources;

receiving at least a portion of the electronic map to be associated with the selected service resource, the portion of the electronic map representing a location of the service resource within the facility; and generating an annotation representing of the selected service resource and the portion of the electronic map.

15. The method of claim 14, wherein receiving at least a portion of the electronic map to be associated with the selected service resource comprises:

determining a current position of the computing device of the service provider, the current position being within the facility represented in the electronic map; and providing the current position of the computing device of the service provider as the at least a portion of the electronic map to be associated with the selected service resource.

16. The method of claim 14, wherein receiving at least a portion of the electronic map to be associated with the selected service resource comprises receiving a selection of at least a portion of the electronic map from the computing device of the service provider to be associated with the selected service resource.

17. The method of claim 10, further comprising operating the processor to:
- receive a second service provider identifier from a second computing device;
- grant to a second computing device access to a second annotation layer of the electronic map based on the second service provider identifier;
- generate at least one annotation in response to receiving at least one selection of a service resource within the facility from the second computing device; and
- store the at least one annotation in the second annotation layer.

18. The method of claim 10, wherein the service resource within the facility comprises at least one of a standpipe connection, a sprinkler pipe connection, a fire hydrant, a gas shut off, a lock box, a fan, a waste disposal room, a waste disposal chute, a waste disposal dumpster, a firefighter phone, an elevator, a sprinkler room, a fire hose cabinet and class, an emergency back-up generator, an overhead door, a main electrical shut off, a roof hatch, an annunciator panel, a roof access stairwell, a unit number, a stairwell label, an access code, a smoke detector, and a defibrillator.

* * * * *